US006883246B1

(12) United States Patent
Latham

(10) Patent No.: US 6,883,246 B1
(45) Date of Patent: Apr. 26, 2005

(54) FREEBOARD MEASURING DEVICE

(76) Inventor: Phillip A. Latham, 226 Walter Rd., River Ridge, LA (US) 70123

( * ) Notice: Subject to any disclaimer, the term of this patent is extended or adjusted under 35 U.S.C. 154(b) by 0 days.

(21) Appl. No.: 10/811,754

(22) Filed: Mar. 29, 2004

(51) Int. Cl.[7] .................................................. G01B 3/02
(52) U.S. Cl. .......................................... 33/720; 73/300
(58) Field of Search ........................... 33/713, 717–720, 33/722, 730; 73/300

(56) References Cited

U.S. PATENT DOCUMENTS

| | | | | |
|---|---|---|---|---|
| 56,436 A | * | 7/1866 | Morse et al. ................. | 73/300 |
| 2,368,589 A | * | 1/1945 | Bierman ....................... | 33/720 |
| 3,396,470 A | * | 8/1968 | Wood ........................... | 33/717 |
| 4,712,305 A | * | 12/1987 | Latham ........................ | 33/720 |
| 4,887,361 A | * | 12/1989 | Latham ........................ | 33/720 |

\* cited by examiner

Primary Examiner—G. Bradley Bennett
(74) Attorney, Agent, or Firm—Keaty Professional Law Corporation

(57) ABSTRACT

A freeboard-measuring device has a central housing with streamlined fins extending along sides and bottom of the housing to prevent uplifting of the housing when lowered into water and minimize resistance to wind and current. The housing defines a chamber with a bottom water ingress allowing swift filling of the inner chamber. A calibrated gauging stick is removably a positioned within the inner chamber. A stabilizing cross bar and a transverse bar are secured by flexible connectors above the housing. The attachment of the stabilizing bars above the water-contacting portion of the measuring device allows to avoid water resistance when using the measuring device.

34 Claims, 4 Drawing Sheets

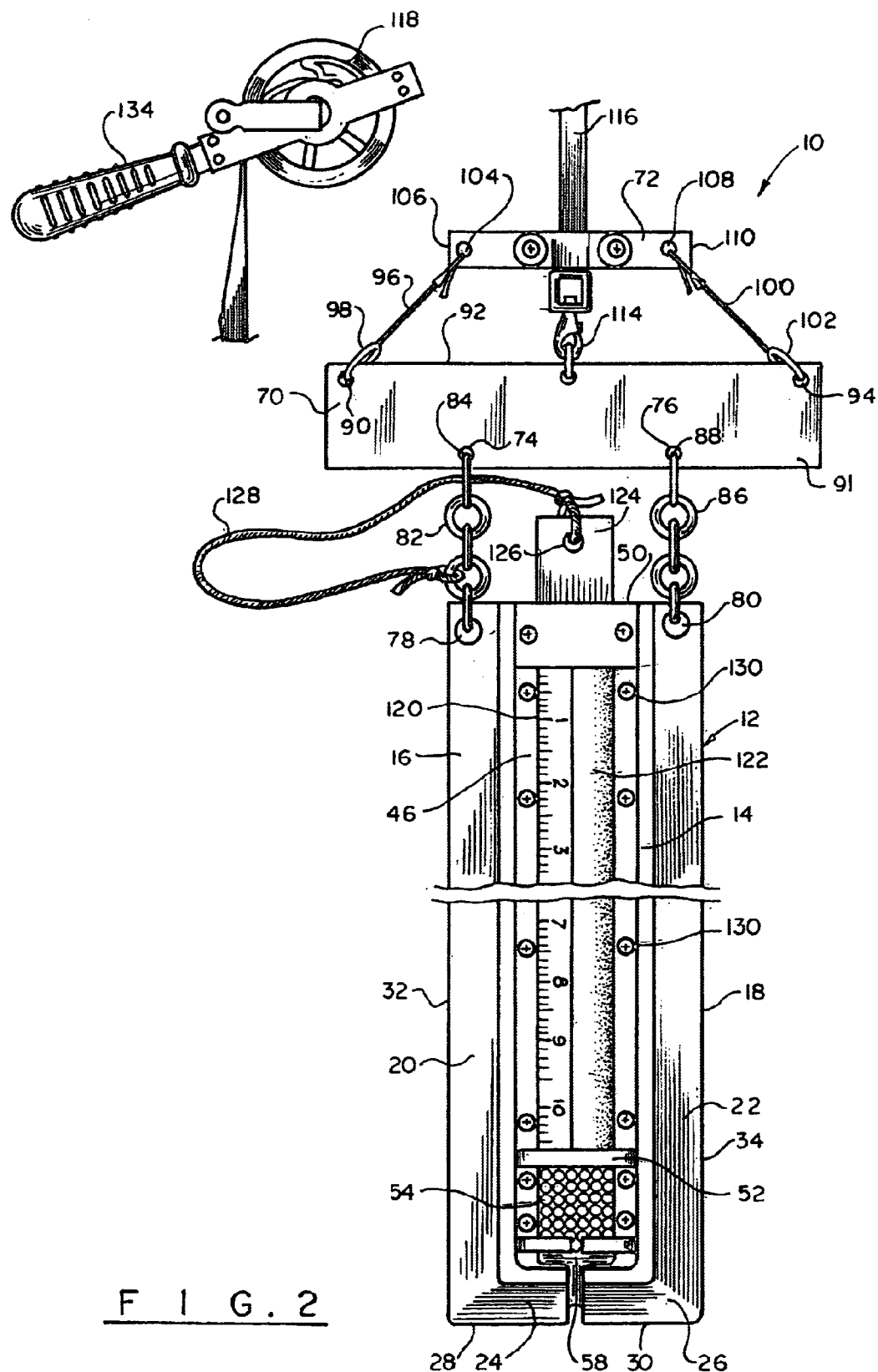
F I G. 2

US 6,883,246 B1

FREEBOARD MEASURING DEVICE

BACKGROUND OF THE INVENTION

The present invention relates to gauging devices, and more particularly to devices for measuring freeboard of ships, barges and other vessels carrying various cargos.

In the shipping industry, there exists a need to swiftly and accurately measure freeboards of vessels to determine the amount of cargo loads carried by the vessels. Many times, the vessels are located in swift currents and/or choppy water conditions. Freeboard measuring devices are disclosed in 4,712,305 issued on Dec. 15, 1987 and U.S. Pat. No. 4,887,361 issued on Dec. 19, 1989. The freeboard measuring devices of the prior patents work satisfactory in many environments. However, it was observed that in severe choppy waters, high winds, and swift currents, these devices may not provide good stability and consequently accurate readings every time.

The present invention contemplates elimination of drawbacks associated with the prior art and provision of a freeboard measuring device that can be used for measuring the change in freeboard of a barge or other floating vessel and which is indicative of varying amounts of cargo carried by the vessel.

SUMMARY OF THE INVENTION

It is therefore an object of the present invention to provide a freeboard-measuring device for use on barges and other marine vessels that can be used in still waters, as well as under heavy wind and choppy water conditions.

It is another object of the present invention to provide a freeboard measuring device that allows swift and accurate freeboard measurement from different parts of the barge or other vessel in rapid succession.

It is a further object of the present invention to provide a freeboard-measuring device that has high stability and resistance to wind and wave action, while allowing adjustable positioning of the device alongside the vessel.

These and other objects of the present invention are achieved through a provision of a freeboard-measuring device that has an elongated housing with streamlined sides and bottom to offer minimum resistance to water current. A stabilizing cross bar is secured above the housing by a pair of spaced apart chain links. A stabilizing transverse bar is secured above the cross bar and is secured to the cross bar by a pair of spaced apart flexible connectors. A swivel member is positioned between the cross bar and the swivel bar to facilitate easy adjustment of position of the freeboard measuring device when lowered into water. The transverse bar is configured for detachable engagement with a sounding tape.

The housing is divided into an inner upper chamber and an inner lower chamber. The lower chamber retains porous material to prevent turbulence of water admitted into the housing. The upper chamber receives a calibrated gauging stick, which has a porous side that temporary retains a watermark. A wall dividing the housing chamber into the upper and lower chambers has apertures allowing ingress of water from the lower chamber into the upper chamber, where the gauging stick is removably positioned. The lower chamber has a groove, which communicates with an opening between the bottom fins and this, with exterior of the housing. Rapid ingress of water allows performing freeboard measurements within 1 second, as compared to 3–4 seconds of prior devices.

BRIEF DESCRIPTION OF THE DRAWINGS

Reference will now be made to the drawings, wherein like parts are designated by like numerals, and wherein

FIG. 2 is a front view of the freeboard-measuring device in accordance with the present invention.

DETAILED DESCRIPTION OF THE PREFERRED EMBODIMENT

Figure 1:
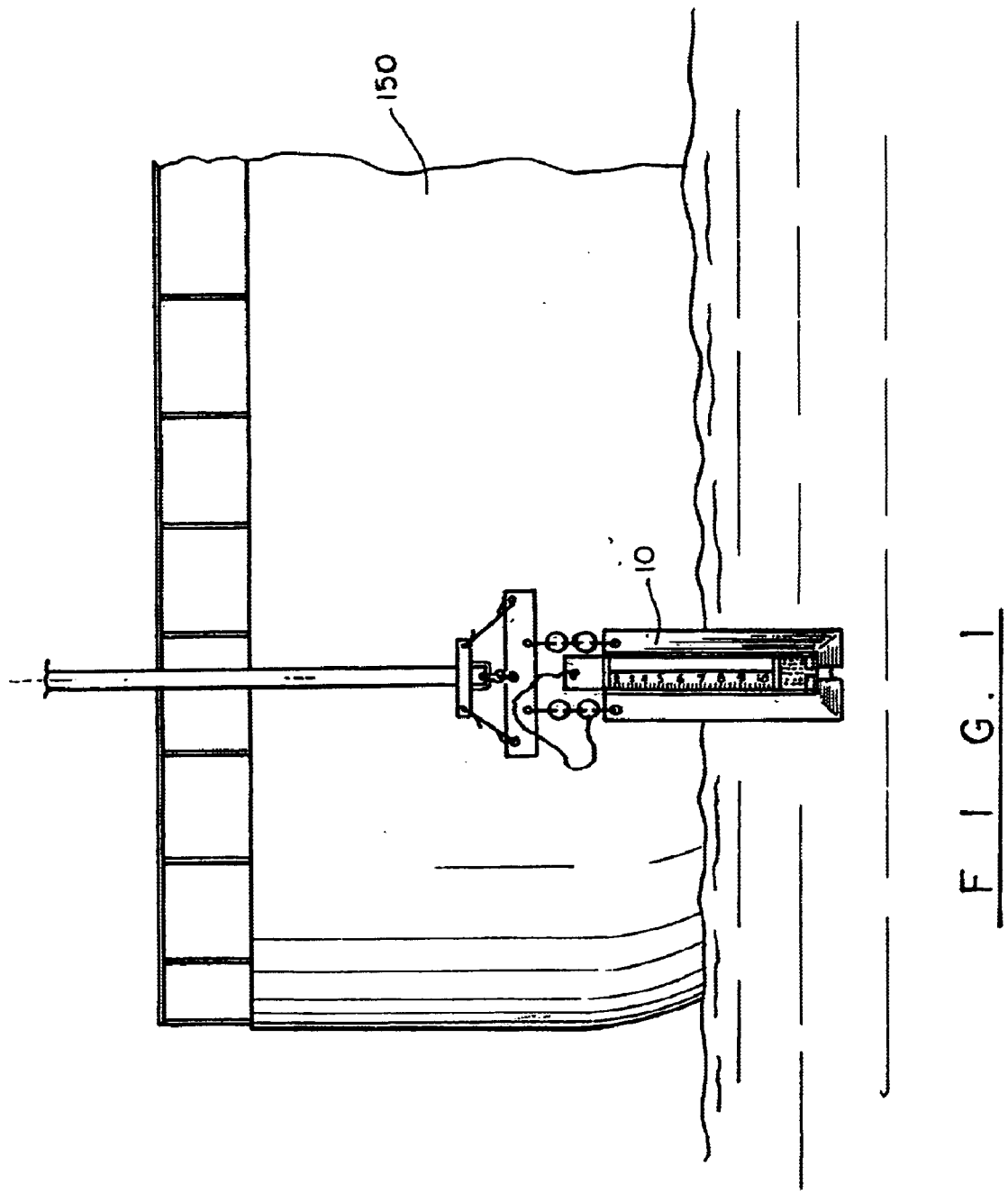
FIG. 1 is a perspective view of the freeboard-measuring device in accordance with the present invention suspended from aboard a ship (not to scale).
Figure 3:
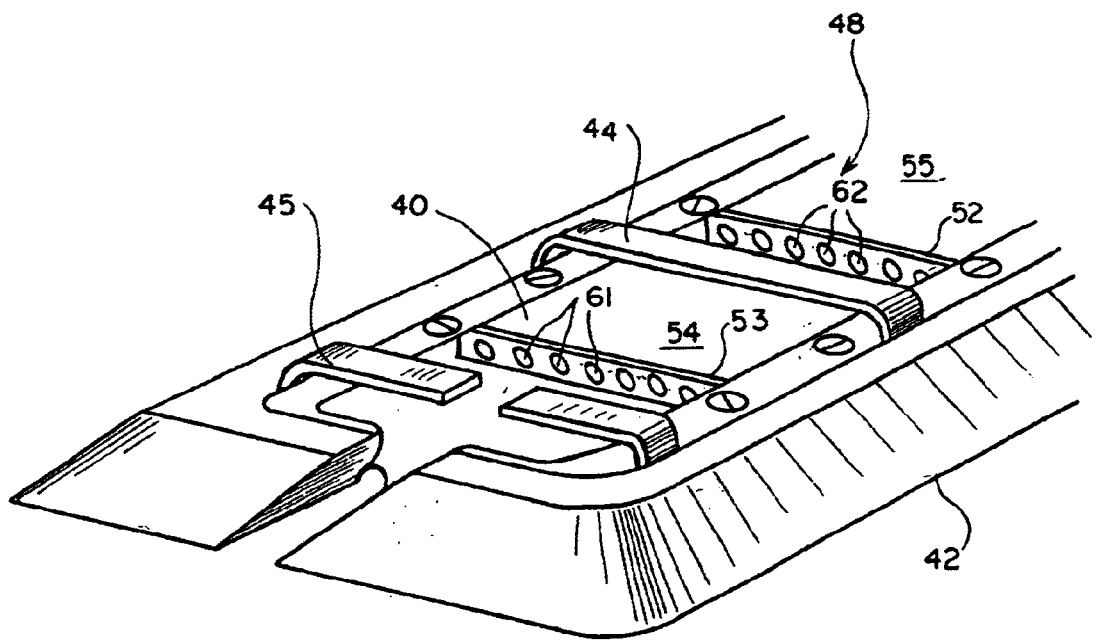
FIG. 3 is a detail perspective view showing a lower portion of the freeboard-measuring device of the present invention.
Figure 5:
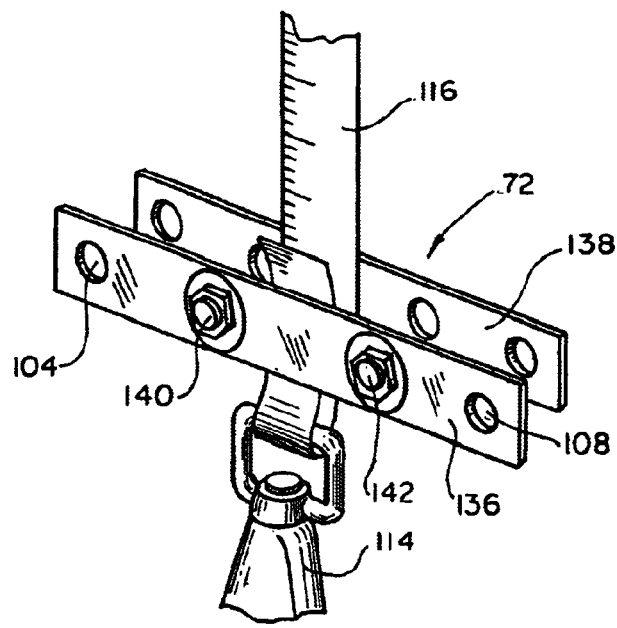
FIG. 5 is a detail view showing the transverse bar engaging a free end of a sounding tape.
Figure 4:
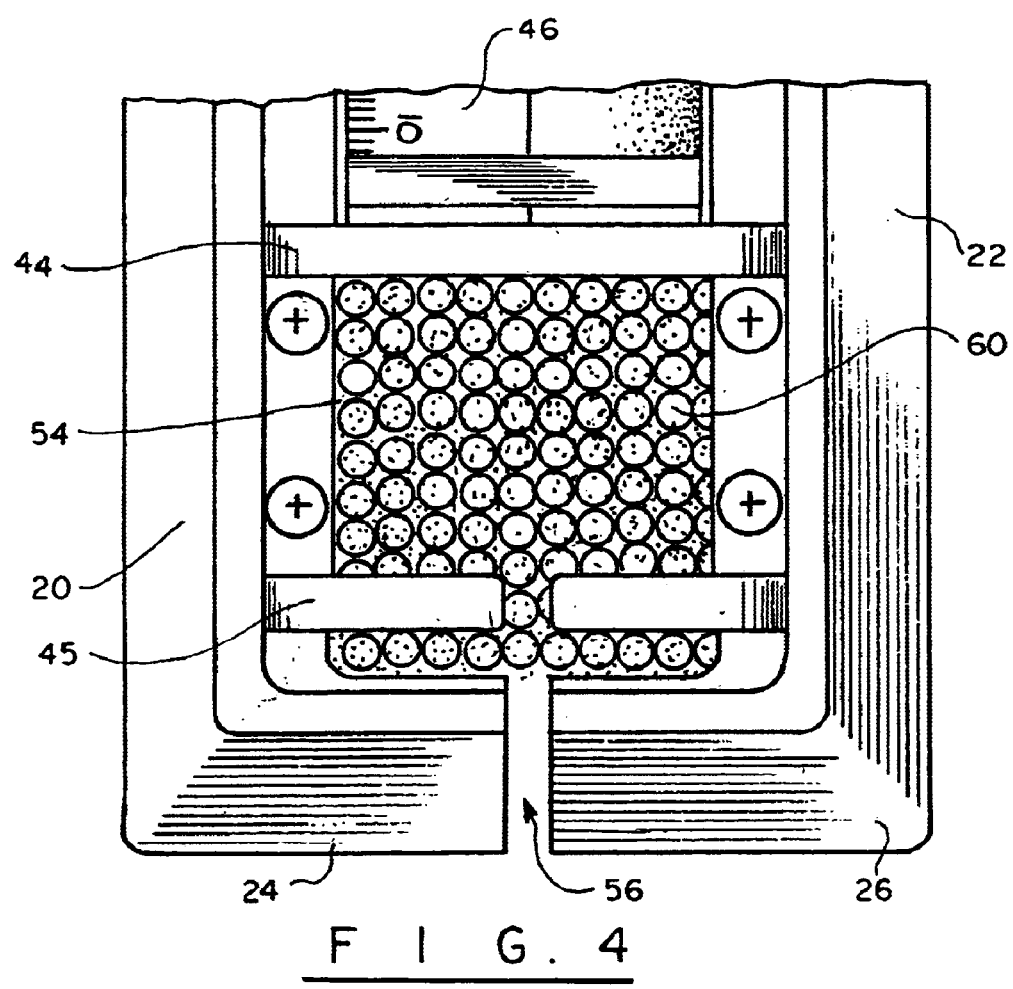
FIG. 4 is a detail front view showing a lower chamber portion of the housing.

Turning now to the drawings in more detail, numeral 10 designates the freeboard-measuring device in accordance with the present invention. The device 10 comprises a housing 12 having a central portion 14. A streamlining means is fixedly attached to the central portion 14 extending along the sides and bottom of the central portion 14. The streamlining means comprises a first fin 16 and a second fin 18. Each fin 16 and 18 has an elongated side portion 20, 22, respectively and a bottom portion 24, 26 respectively. The side portion 20 is integrally formed with the bottom portion 24. The side portion 22 is integrally formed with the bottom portion 26.

Similarly to the side portions 20 and 22, the bottom portions 24 and 26 have streamlines configurations with a bottom edges 28 and 30 defining the lowermost edge of the housing 12. The outermost edges 28, 30. 32 and 34 have sharpened edges in order to offer less resistance to water flow when the device 10 is lowered into the water. Provision of the streamlines bottom edges 28 and 30 prevents uplifting of the housing 12 and distortion of freeboard readings.

The central portion 14 has a recessed front wall 40 and a back wall 42. A central chamber 48 is defined between the front wall 40 and the back wall. The front wall 42 is made of a transparent material to allow visual observation a gauging stick 46 removably positioned within the central chamber 48. The transparent material may be high impact plastic suitable to withstand impact with the hull of the vessel and wind and wave action during the use of the device 10. A pair of protective bars 44, 45 extend in front of the wall 40 further protecting the wall 40 from an undesirable impact with hard objects.

The chamber 48 has an open top 50, through which the gauging stick 46 is lowered into the central portion 14. A separation wall 52 formed from a non-corrosive material divides the chamber 48 from a lower chamber 54 and an upper chamber 55. The lower chamber 54 communicates with the exterior of the device 10 through a channel 56 formed between the adjacent bottom fin portions 24, 26 and a groove 58 formed in the bottom of the housing, below the protecting bar 45.

A lower chamber filter 53 formed from a non-corrosive material is fitted transversely to the longitudinal axis of the central portion 14. The filter 53 is provided with a plurality of openings 61 allowing fluid communication between the groove 58 and the lower chamber 54. The filter 53, similar to the separation wall 52, may be formed from strips of aluminum.

A means for preventing water turbulence is positioned in the lower chamber 54. The turbulence preventing means may be a packing of fibrous material 60 or a nylon filter fitted into the lower chamber 54. The packing 60 allows water to fill the chamber 54 and seep into the upper chamber 55. A plurality of small sized openings 62 is formed in the separation wall 52 allowing water to enter into the upper chamber 48 and contact the gauging stick 46.

The device 10 of the present invention is provided with stabilizing means for stabilizing position of the housing 12 in high wind and choppy water. The stabilizing means comprises a cross bar 70 secured above the housing 12 and a transverse bar 72 positioned above the cross bar 70. The cross bar 70 is secured to the housing 12 at two spaced-apart points 74 and 76, which are located adjacent a lower edge 91 of the cross bar 70. An opening 78 is formed in the fin 16 and an opening 80 is formed in the fin 18. A flexible connector, for instance a ring chain 82, is engaged through the opening 78 and through an opening 84 formed at the attachment point 74 of the cross bar 70.

A second flexible connector, for instance a ring chain 86 is engaged through the opening 80 in the fin 18 and through an opening 88 formed at the attachment point 76 in the cross bar 70. The attachment points 74 and 76 are equidistantly spaced from a horizontal center axis of the cross bar 70 to properly balance the suspended cross bar 70 when the device 10 is lowered into water.

An opening 90 is formed adjacent an upper edge 92 of the cross bar 70. A corresponding opposite opening 94 is formed adjacent the edge 92 at the opposite side of the cross bar 70. A flexible securing line 96 is attached to an attachment ring 98 which passes through the opening 90. A flexible line 100 is attached to a ring 102 which passes through the opening 94. A free end of the flexible line 96 is engaged within an opening 104 formed adjacent one end 106 of the transverse bar 72. The flexible line 100 is similarly engaged within an opening 108 formed adjacent the second end 110 of the transverse bar 72.

A third opening 112 is formed in the center of the main transverse bar 70 adjacent to the upper edge 92. A swivel member 114 is engaged with the opening 112 a limited swivel action of the cross bar 70 and the transverse bar 72. The provision of the flexible links 82, 86, 96, 100 in cooperation with the swivel member 114 provides a positive control to be exerted on the device 10 and prevent severe movement in wind or water current.

The transverse bar 72 is configured for detachable engagement with a sounding device 134. As can be seen in FIG. 2, the sounding device 134 has a reel 118 with a sounding tape 116 wound thereon. A free end of the sounding tape is engageable with the transverse bar 72. The transverse bar 72 comprises two plates 136, 138 retained in a spaced parallel relationship by a pair of securing members 140, 142, which may be bolts or other detachably engageable elements.

A free end of the sounding tape 116 is fitted between the plates 136, 138 in a location between the securing members 140, 142. The securing members are then tightened, sandwiching the tape 116 within the transverse bar plates 136 and 138. When the freeboard measuring is complete, the securing members 140, 142 are released and the sounding unit 134 may be used for other purposes. Alternatively, the snap rings 98, 102 and the swivel member 114 may be quickly released, allowing the sounding unit 134 to be used separately from the device 10.

The gauging stick 46 has a calibrated side 120 and a non-calibrated side 122. The side 122 of the gauging stick 46 may be covered by a strip of porous material which can retain a watermark, for a short period of time, that can be easily observed by the person reading the device 10 when the measuring stick 46 is withdrawn from the chamber 48. The watermark is read in conjunction with the indicia that is printed on the side 120.

The top end 124 of the gauging stick 46 has an opening 126 for receiving a flexible attachment line 128 therein. The free end of the flexible attachment line 128 is secured to one of the chain rings in the links 82 or 86 so as to retain the gauging stick 46 together with the remainder of the measuring device 10 in between uses. The gauging stick 46 is calibrated so that "0" point on the measuring side 120 corresponds to "0'-0" of conventional measuring devices.

It is preferred that the main body 12, the first transverse bar 70 and the second transverse bar 72, as well as the connecting links be made of rust proof lightweight material that can withstand corrosive environments while protecting the gauging stick 46 from heavy impact. Aluminum was found to be a suitable material for the purposes of making the rust-proof parts of the device of the present invention.

The front plastic wall 40 may be secured to the main body portion 14 by bolts 130, by an adhesive or other such suitable means. The back wall 42 of the device 10 is made flat, allowing the main body 12 to lie flat against the hull of the a vessel 150.

In operation, the user holds the sounding unit 134 and allows the sounding tape 116 to unwind form the reel 118. The device 10 is secured with the transverse bar 72 and is suspended therefrom. The device 10 is then lowered into water along the vessel 150. The transverse bars 70 and 72, along with the swivel connection 114 allow positive control of the position of the device 10 when lowered into water. In addition, good wind resistance is achieved through the provision of the double bars which retain the main body 12 in a level condition even when the vessel is listed to one side and the device 10 has to rotate on the suspended tape 116.

When the device 10 is lowered into the water, the uplifting if the housing 12 is prevented through the streamlined bottom edges 28, 30 of the fins 16 and 18. The water is allowed to enter the lower chamber 54 and seep into the upper chamber 55. The device 10 is lowered to a point where the bottom of the main body 12 is below the surface of water.

The device is further lowered to a minimum of four inches below the water surface or until an even inch reading at the straight edge of the gauging stick 46 is observed. Provision of the bottom channel 56 and the bottom groove 58 allows a swift ingress of water into the lower chamber 54 and the upper chamber 55. The water fills the chamber within 1 second as compared to 3–4 seconds in the prior design.

Once the water fills the upper chamber 46 to a level where the reading becomes stable, the device 10 is lifted from the water, the gauging stick 46 is removed and the measurement of the watermark on the side 122 is taken. The measuring of the freeboard is taken at different points from the deck of the vessel 150. Usually the sum of two measurements, from the straight edge of the main deck and from the side of the vessel provide an accurate freeboard reading. The gauging stick 46 can then be wiped dry and the measuring procedure repeated at the next desired location from the deck of the vessel 150, taking considerably less time as compared to the procedures where prior freeboard measuring devices are used.

In addition to providing faster measurements, the device 10 of the present invention provides better wind resistance through the stabilizing bars 70 and 72. The positive control of the device is achieved even in most choppy waters and high winds. The bottom ingress of water allows quick filling of the inner chambers resulting in efficient and less costly operation.

Positioning of the stabilizing bars 70, 72 above the housing 12 lowers resistance of the device 10 when it enters the water, which considerably improves the operational speed of freeboard measuring. With the sounding tape, cross bar and the transverse bar connected by flexible lines, which are balanced and spaced apart, the danger of losing the sounding device and the measuring device is considerably reduced. In prior devices, there is always a danger of one part being accidentally twisted or broken. Sounding tapes commonly tend to break just above the swivel. But with the transverse bar tightly attached above the swivel, the chance of breaking the tape is greatly reduced.

Many changes and modifications can be made in the design of the present invention without departing from the spirit thereof. I therefore pray that my rights to the present invention be limited only by the scope of the appended claims.

I claim:

1. A freeboard measuring device, comprising:
   an elongated housing means having a means for water ingress formed in said housing means;
   a means for freeboard measurement mounted, at least in part, within said elongated housing means; and
   a stabilizing means secured above the housing means and extending transversely to a longitudinal axis of the housing means for stabilizing vertical orientation of said housing means.

2. The device of claim 1, wherein said stabilizing means comprises at least one cross bar secured to an upper part of the housing means by a flexible connecting means.

3. The device of claim 2, wherein said flexible connecting means comprises a pair of connectors attached equidistantly from central axes of said housing means and said at least one cross bar.

4. The device of claim 3, wherein each of said connectors comprises a plurality of interlocking rings.

5. The device of claim 2, wherein said stabilizing means further comprises a transverse bar secured above said at least one cross bar.

6. The device of claim 5, further comprising a swivel connecting member securing central portions of said at least one cross bar and said transverse bar.

7. The device of claim 6, wherein a flexible attachment member extends between respective ends of said at least one cross bar and said transverse bar for resisting wind and wave actions, while stabilizing position of the housing means.

8. The device of claim 5, wherein said at least one cross bar has a longitudinal dimension substantially greater than the longitudinal dimension of the transverse bar.

9. The device of claim 5, wherein said transverse bar is adapted for detachable engagement with a sounding tape.

10. The device of claim 1, wherein said housing means comprises a central portion and a fin means securely attached along elongated sides of said central portion for streamlining said device in water without increasing its resistance to a water flow acting on the sides of the housing means.

11. The device of claim 10, wherein said fin means extends along a bottom portion of the housing for streamlining the housing and preventing uplifting of the housing when lowered into water.

12. The device of claim 11, wherein said fin means comprises a pair of fins, each fin having a generally triangular cross-section.

13. The device of claim 11, wherein portions of said fins means attached along the bottom of said central portion form a channel communicating with an exterior of said housing means, and said bottom portion is provided with at least one opening in fluid communication with said channel for admitting water into said central portion.

14. The device of claim 10, wherein said central portion defines a central chamber divided into a lower chamber and an upper chamber by a transverse separation wall, said lower chamber being in fluid communication with said at least one opening.

15. The device of claim 14, wherein said upper chamber is configured for detachably receiving said means for freeboard measurement.

16. The device of claim 14, wherein said separation wall is provided with at least one aperture allowing fluid communication between said lower chamber and said upper chamber.

17. The device of claim 1, wherein said means for freeboard measurement comprises a calibrated gauging stick having a measuring indicia and a strip of porous moisture-sensitive material attached thereto, said strip retaining, at least temporarily, a water mark upon contact with water.

18. A freeboard measuring device, comprising:
   an elongated housing having means for water ingress formed in a bottom thereof and a central chamber in fluid communication with said means for water ingress;
   a means for freeboard measurement detachably mounted, at least in part, within said housing; and
   a stabilizing means secured above the housing means and extending transversely to a longitudinal axis of the housing means for stabilizing vertical orientation of said housing and facilitating resistance to wind and wave action, said stabilizing means comprising a cross bar secured above said housing and a transverse bar secured above said cross bar.

19. The device of claim 18, further comprising a means for streamlining position of said housing in water.

20. The device of claim 19, wherein said streamlining means comprises a pair of fins secured along sides and bottom of said housing, said fins having a generally triangular cross-section.

21. The device of claim 20, wherein portions of said fins secured to the bottom of said housing define a channel for admitting water into said means for water ingress.

22. The device of claim 19, wherein said cross bar is connected to the housing by a flexible connecting means, and said transverse bar is secured to the cross bar by a flexible attachment means.

23. The device of claim 22, wherein said flexible connecting means comprises a pair of flexible chain links attached to the cross bar and the transverse bar.

24. The device of claim 22, wherein said attachment means comprises a pair of flexible cables securing the cross bar to the transverse bar.

25. The device of claim 22, wherein said transverse bar is adapted for detachable engagement with a sounding tape.

26. The device of claim 25, wherein said transverse bar comprises a pair of plates retained in a parallel relationship by tightening members, and wherein said plates are configured to receive the sounding tape between the tightening members.

27. The device of claim 26, wherein a swivel member is secured between the cross bar and the transverse bar to allow a limited swivel motion between the cross bar and the transverse bar.

28. The device of claim 18, wherein said central chamber is divided into an upper chamber and a lower chamber, and wherein said lower chamber houses a means for preventing water turbulence within said central chamber.

29. The device of claim 28, wherein said means for preventing water turbulence comprise a packing of fibrous material positioned inside the lower chamber.

30. A freeboard measuring device, comprising:

an elongated housing having means for water ingress formed in a bottom thereof and a central chamber in fluid communication with said means for water ingress;

a pair of streamlined fins securely attached to and extending along elongated sides and bottom of the housing;

a means for freeboard measurement detachably mounted, at least in part, within said housing, said means for freeboard measurement comprising a calibrated gauging stick having a strip of porous moisture-sensitive material attached thereto, said strip retaining, at least temporarily, a water mark upon contact with water; and a stabilizing means secured above the housing and extending transversely to a longitudinal axis of the housing for stabilizing vertical orientation of said housing and facilitating resistance to wind and wave action, said stabilizing means comprising a cross bar secured above said housing and a transverse bar secured above said cross bar by a swivel member to allow adjustment of the position of said cross bar in relation to the transverse bar.

31. The device of claim 30, wherein said transverse bar is adapted for detachable engagement with a sounding tape.

32. The device of claim 31, wherein said transverse bar comprises a pair of plates retained in a parallel relationship by tightening members, and wherein said plates are configured to receive the sounding tape between the tightening members.

33. The device of claim 30, wherein said cross bar is connected to the housing by a flexible connecting means, and said transverse bar is secured to the cross bar by a flexible attachment means.

34. The device of claim 33, wherein said flexible connecting means comprises a pair of flexible chain links attached to the cross bar and the transverse bar.

* * * * *